US011971066B2

(12) United States Patent
Scroggie et al.

(10) Patent No.: US 11,971,066 B2
(45) Date of Patent: Apr. 30, 2024

(54) PUSH THROUGH RETAINER CONNECTION WITH INTEGRATED HINGING SEAL

(71) Applicant: Illinois Tool Works Inc., Glenview, IL (US)

(72) Inventors: Derek Scroggie, Macomb, MI (US); Michelle E. Bozinovski, Oakland Charter Township, MI (US); Robert A. Murawski, Clinton Township, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/984,088

(22) Filed: Nov. 9, 2022

(65) Prior Publication Data

US 2023/0072112 A1 Mar. 9, 2023

Related U.S. Application Data (63) Continuation of application No. 16/897,947, filed on Jun. 10, 2020, now Pat. No. 11,578,740, which is a
(Continued)

(51) Int. Cl.
*F16B 5/00* (2006.01)
*F16B 2/22* (2006.01)
(Continued)

(52) U.S. Cl.
CPC .............. *F16B 5/0084* (2013.01); *F16B 2/22* (2013.01); *F16B 5/0607* (2013.01); *F16B 19/00* (2013.01);
(Continued)

(58) Field of Classification Search
CPC .. F16B 2/22; F16B 5/00; F16B 5/0084; F16B 5/0607; F16B 5/0657; F16B 19/00;
(Continued)

(56) References Cited

U.S. PATENT DOCUMENTS 3,249,973 A   5/1966  Seckerson
3,550,217 A  12/1970  Collyer
(Continued)

FOREIGN PATENT DOCUMENTS

FR   2913738 B1   10/2009
JP   1174079 S    5/2003
(Continued)

OTHER PUBLICATIONS

International Search Report and Written Opinion for PCT/US2013/073861, dated Mar. 28, 2014 (14 pages).
(Continued)

*Primary Examiner* — Roberta S Delisle
(74) *Attorney, Agent, or Firm* — Quarles & Brady LLP (57) ABSTRACT

A press-in retainer includes a retainer head having a collar and a seal disposed at least partially about the collar. A clip portion projects from the collar. The seal includes a main body engaging the collar and a sealing foot disposed entirely outboard from the collar. The sealing foot is configured to hinge about an intersection of the sealing foot and body portion while remaining entirely outboard from the main body. In a substantially flattened condition of the sealing foot, an angle between the sealing foot and a distal surface of the main body approaches a flat contiguous surface.

20 Claims, 4 Drawing Sheets

Related U.S. Application Data continuation of application No. 15/987,986, filed on May 24, 2018, now Pat. No. 10,683,882, which is a continuation of application No. 14/652,819, filed as application No. PCT/US2013/073861 on Dec. 9, 2013, now Pat. No. 9,982,694.

(60) Provisional application No. 61/739,604, filed on Dec. 19, 2012.

(51) Int. Cl.
  *F16B 5/06* (2006.01)
  *F16B 19/00* (2006.01)
  *F16B 21/08* (2006.01)

(52) U.S. Cl.
  CPC .......... *F16B 19/008* (2013.01); *F16B 21/086* (2013.01); *F16B 5/00* (2013.01); *F16B 5/0657* (2013.01); *F16B 2005/0678* (2013.01); *Y10T 24/44026* (2015.01); *Y10T 29/49828* (2015.01)

(58) Field of Classification Search
  CPC .................. F16B 19/008; F16B 21/086; F16B 2005/0678; Y10T 24/44026; Y10T 29/44828
  USPC ............................ 29/428; 411/508, 509–510
  See application file for complete search history.

(56) References Cited

U.S. PATENT DOCUMENTS

| | | | |
|---|---|---|---|
| 3,577,603 A | 5/1971 | Seckerson | |
| 3,678,797 A | 7/1972 | Seckerson | |
| 3,745,612 A | 7/1973 | Seckerson | |
| 3,771,275 A | 11/1973 | Seckerson | |
| 3,988,808 A | 11/1976 | Poe | |
| 4,188,040 A | 2/1980 | Wolf | |
| D268,006 S | 2/1983 | Wollar | |
| D268,894 S | 5/1983 | Wollar | |
| D273,091 S | 3/1984 | Kurosaki | |
| 4,534,530 A | 8/1985 | Danko | |
| D284,934 S | 8/1986 | Okawa | |
| D291,054 S | 7/1987 | Niwa | |
| D291,057 S | 7/1987 | Shiraishi | |
| D293,882 S | 1/1988 | Takahashi | |
| D293,883 S | 1/1988 | Hirohata | |
| D293,884 S | 1/1988 | Hirohata | |
| D297,613 S | 9/1988 | Yokoyama et al. | |
| D297,614 S | 9/1988 | Yokoyama et al. | |
| D297,615 S | 9/1988 | Nakama | |
| 4,778,320 A | 10/1988 | Nakama | |
| D298,736 S | 11/1988 | Shiraishi | |
| 4,888,919 A | 12/1989 | Strosberg | |
| 4,906,154 A | 3/1990 | Sheppard | |
| 5,028,187 A | 7/1991 | Sato | |
| D324,168 S | 2/1992 | Fujioka | |
| D324,992 S | 3/1992 | Ono et al. | |
| D325,696 S | 4/1992 | Kurihara et al. | |
| D326,049 S | 5/1992 | Kurihara et al. | |
| D326,605 S | 6/1992 | Nakanura | |
| 5,173,026 A * | 12/1992 | Cordola .................. | F16B 5/065 |
| | | | 24/297 |
| 5,319,839 A | 6/1994 | Shimajiri | |
| 5,339,491 A | 8/1994 | Sims | |
| D354,219 S | 1/1995 | Shimajiri | |
| D355,113 S | 2/1995 | Shimajiri | |
| 5,393,185 A | 2/1995 | Duffy, Jr. | |
| 5,419,606 A | 5/1995 | Hull et al. | |
| D362,176 S | 9/1995 | Solbeck | |
| 5,458,365 A | 10/1995 | Rogers | |
| 5,573,362 A | 11/1996 | Asami | |
| D378,349 S | 3/1997 | Saito et al. | |
| D380,667 S | 7/1997 | Kanamori et al. | |
| D381,258 S | 7/1997 | Saito | |
| D382,466 S | 8/1997 | Hirose | |
| D382,468 S | 8/1997 | Takahashi | |
| 5,704,753 A | 1/1998 | Ueno | |
| D390,776 S | 2/1998 | Ueno | |
| D392,554 S | 3/1998 | Shimazu et al. | |
| 5,797,714 A | 8/1998 | Oddenino | |
| 5,857,244 A | 1/1999 | Edwards | |
| 5,865,500 A | 2/1999 | Sanada | |
| D410,194 S | 5/1999 | Hilton et al. | |
| 6,305,055 B1 | 10/2001 | Castro | |
| 6,315,510 B1 * | 11/2001 | Sturies .................... | F16B 13/00 |
| | | | 411/60.2 |
| D451,789 S | 12/2001 | Hsieh | |
| D456,699 S | 5/2002 | Nakanishi | |
| D464,873 S | 10/2002 | Nemoto | |
| D471,084 S | 3/2003 | Nemoto | |
| 6,572,317 B2 | 6/2003 | Okada | |
| 6,659,701 B1 | 12/2003 | Risdale | |
| D484,779 S | 1/2004 | Shibuya | |
| 6,715,185 B2 | 4/2004 | Angellotti | |
| 6,805,524 B2 | 10/2004 | Kanie | |
| D498,414 S | 11/2004 | Yoneoka | |
| D500,245 S | 12/2004 | Okada | |
| 6,910,840 B2 | 6/2005 | Anscher | |
| 6,974,292 B2 | 12/2005 | Hansen | |
| 7,017,239 B2 | 3/2006 | Kurily et al. | |
| D529,793 S | 10/2006 | Kuroda | |
| 7,152,281 B2 | 12/2006 | Scroggie | |
| D536,956 S | 2/2007 | Huang | |
| D564,344 S | 3/2008 | Nakazato | |
| D566,534 S | 4/2008 | Okada | |
| D566,535 S | 4/2008 | Asano et al. | |
| D577,284 S | 9/2008 | Katoh | |
| 7,444,721 B2 | 11/2008 | Smith | |
| D582,262 S | 12/2008 | Kudo | |
| 7,481,474 B2 | 1/2009 | Higgins | |
| D589,333 S | 3/2009 | Nakazato | |
| D590,242 S | 4/2009 | Carter | |
| D617,178 S | 6/2010 | Sakai | |
| 7,770,266 B2 | 8/2010 | Higgins | |
| 7,784,159 B2 | 8/2010 | Dickinson | |
| D625,587 S | 10/2010 | Obuchi et al. | |
| D632,550 S | 2/2011 | Watanabe | |
| D635,451 S | 4/2011 | Sekine | |
| 7,927,050 B2 | 4/2011 | Koike | |
| D640,917 S | 7/2011 | Okada et al. | |
| D664,027 S | 7/2012 | Vosika et al. | |
| 8,221,041 B2 * | 7/2012 | Hauser .................. | F16B 21/082 |
| | | | 411/508 |
| D665,245 S | 8/2012 | Nakazato | |
| D666,900 S | 9/2012 | Ogino et al. | |
| D673,841 S | 1/2013 | Hirano | |
| D675,506 S | 2/2013 | Araki | |
| D675,507 S | 2/2013 | Araki | |
| D675,508 S | 2/2013 | Hirano | |
| 8,393,058 B2 * | 3/2013 | Okada .................. | B60R 13/0206 |
| | | | 24/297 |
| D686,487 S | 7/2013 | Handa et al. | |
| 8,511,631 B2 | 8/2013 | Kato | |
| D688,937 S | 9/2013 | Brewer | |
| 8,561,265 B2 * | 10/2013 | Benedetti .............. | F16B 21/086 |
| | | | 24/297 |
| D695,600 S | 12/2013 | Fujioka | |
| D701,112 S | 3/2014 | Ukai et al. | |
| D701,450 S | 3/2014 | Ukai et al. | |
| D704,538 S | 5/2014 | Fujiwara | |
| 8,806,722 B2 * | 8/2014 | Iwahara ................ | F16B 21/086 |
| | | | 24/453 |
| 8,834,087 B2 * | 9/2014 | Kirchen ................ | F16B 21/086 |
| | | | 411/509 |
| 8,883,059 B2 | 11/2014 | Lewis | |
| 8,936,420 B2 | 1/2015 | Scroggie et al. | |
| 8,950,042 B2 | 2/2015 | Smith | |
| D723,906 S | 3/2015 | Kato et al. | |
| D724,419 S | 3/2015 | Ikeda | |
| 9,011,061 B2 * | 4/2015 | Hofmann .............. | F16B 33/004 |
| | | | 411/371.1 |
| 9,150,145 B2 | 10/2015 | Wandelt | |
| D752,952 S | 4/2016 | Barz | |

(56) References Cited

U.S. PATENT DOCUMENTS

| | | | |
|---|---|---|---|
| D768,472 S | 10/2016 | Yoshihashi | |
| 9,649,993 B1 | 5/2017 | Dickinson | |
| D803,037 S | 11/2017 | Maloney et al. | |
| 9,873,388 B2 | 1/2018 | Meyers et al. | |
| D817,162 S | 5/2018 | Kaji et al. | |
| D863,049 S | 10/2019 | Sweeney et al. | |
| 10,451,100 B2 | 10/2019 | Flynn | |
| 10,688,943 B2 | 6/2020 | Bachelder et al. | |
| 2003/0156917 A1 | 8/2003 | Heflin et al. | |
| 2005/0079033 A1 | 4/2005 | Benedetti | |
| 2005/0150087 A1 | 7/2005 | Lyndan | |
| 2005/0189775 A1 | 9/2005 | De Pue | |
| 2006/0086765 A1 | 4/2006 | Harberts | |
| 2006/0099051 A1* | 5/2006 | Moerke | F16B 19/008 411/508 |
| 2006/0117535 A1 | 6/2006 | Fraser | |
| 2006/0231690 A1 | 10/2006 | Cooley et al. | |
| 2007/0166127 A1 | 7/2007 | Scroggie et al. | |
| 2008/0066266 A1 | 3/2008 | Scroggie | |
| 2010/0098515 A1 | 4/2010 | Raymond | |
| 2010/0029376 A1 | 11/2010 | Koike | |
| 2011/0119875 A1 | 5/2011 | Iwasaki | |
| 2011/0243688 A1 | 10/2011 | Klein | |
| 2012/0261942 A1 | 10/2012 | Benedetti | |
| 2013/0129450 A1 | 5/2013 | Aoki | |
| 2014/0196259 A1* | 7/2014 | Kuhm | F16B 21/086 24/289 |
| 2015/0322985 A1 | 11/2015 | Scroggie et al. | |
| 2018/0339665 A1 | 11/2018 | Diep et al. | |

FOREIGN PATENT DOCUMENTS

| | | |
|---|---|---|
| JP | 4252827 B2 | 1/2009 |
| JP | 4248681 B2 | 4/2009 |
| JP | 4806495 B2 | 8/2011 |
| WO | 2009123616 A1 | 10/2009 |
| WO | 2011/043352 A1 | 4/2011 |
| WO | 2012092473 A1 | 7/2012 |
| WO | 2017205022 A1 | 11/2017 |

OTHER PUBLICATIONS

GM Rocker Mounting Clip with Sealer 11571175 (for Chevrolet Traverse 2010), Car-Pak Manufacturing Company, Troy, Michigan, Feb. 2009, p. 3 (http://www.usrubberparts.de/catalogs/carpak_zusatzkatalog.pdf).

GM Rocker Moulding & Grille Moulding Clip 25724529 (for Pontiac Bonneville 1992+) (Source: Au-ve-co Products Co., 2008, The Complete Fastener Line, Section 20, General Motors Clips & Fasteners, p. 417 (http://www.srubberparts.de/catalogs/carpak_zusatzkatalog.pdf).

GM Rocker Panel Moulding Clip With Sealer GM 5480852 (for Chevrolet Equinox 2005) Car-Pak Manufacturing Company, Troy, Michigan, Feb. 2009, p. 12 http://www.usrubberparts.de/catalogs/carpak_zusatzkatalog.pdf).

Termax Part No. 71093 Sealing—Umbrella Clip, "Termax Corporation Fastener Systems Catalog," p. 4-23, at least as early as Feb. 18, 2010 (153 pages).

Termax Part No. 71101 Sealing Umbrella Clip for 0.5-1.5 Panel, Termax Corporation, Lake Zurich, Illinois, at least as early as Jul. 29, 2010 (1 page).

Termax Part No. 71103 Sealing Umbrella Clip for 1.5-2.5 Panel, Termax Corporation, Lake Zurich, Illinois, at least as early as Dec. 6, 2011 (1 page).

Decision in Inter Partes Review No. IPR2021-00724, for Patent No. 10683882B2, *Termax LLC* v. *Illinois Tool Works Inc.*, dated Oct. 4, 2022 (67 pages).

* cited by examiner

PUSH THROUGH RETAINER CONNECTION WITH INTEGRATED HINGING SEAL

CROSS-REFERENCE TO RELATED APPLICATIONS

This application is a continuation of U.S. patent application Ser. No. 16/897,947, filed Jun. 10, 2020, which is a continuation of U.S. patent application Ser. No. 15/987,986, filed May 24, 2018, which is a continuation of U.S. patent application Ser. No. 14/652,819 filed Jun. 17, 2017, now U.S. Pat. No. 9,982,694, which is a National Phase of International Application Number PCT/US2013/073861 filed Dec. 9, 2013, which claims the benefit of, and priority from, U.S. Provisional Application No. 61/739,604 filed Dec. 19, 2012, all of which are hereby incorporated by reference in their entireties.

TECHNICAL FIELD

The present disclosure relates generally to connection assemblies incorporating retainers which may also be referred to as fasteners. More particularly, this disclosure pertains to connections incorporating push-in type retainers having downward biasing wing features which secure the retainer in place after insertion through an aperture and with seals for creating a barrier to the penetration of moisture, dust and noise through the aperture in which the retainer is secured.

BACKGROUND

Push-in type W-base retainers are used in a variety of connection assemblies to secure components of the assembly. For example, in automobiles such stud-like retainers are used to secure molding or other surface structures to underlying support elements such as body panels, support beams or the like. Such retainers typically include a stem with deflectable wing elements for securing the retainer to the support elements when the stem portion supporting the deflectable wing elements is pushed through an aperture in the support element. Typically, a head attached to the stem is configured for attachment to a doghouse or other complementary receiving element on the underside of the surface structure. In this regard, the head may include an enhanced diameter upper platform radial collar feature and an enhanced diameter lower radial collar feature with a spacing post extending between the upper and lower radial collar features. Thus, the spacing post may slide into a doghouse or other receiving element as will be well known to those of skill in the art and thereafter be blocked against axial withdrawal by the upper and lower radial collar features.

During use, as the stem is inserted into the aperture, the deflectable members may be compressed radially inwardly. The deflectable members then may spring outwardly as insertion is completed to lock behind the underside of the support element. Thus, with the head secured to the surface structure, the retainer forms a connection between the surface structure and the underlying support element.

W-base retainers are typically designed as a component of an overall assembly and work in conjunction with the other components with the goal of establishing and maintaining a "zero gap" condition between the sheet metal panel or other support element and the molding or other surface structure. To promote the desired "zero gap" condition, the W-base retainers typically provide a continuous pull down or clamp load condition. This constant pull down is intended to provide and maintain the desired "zero gap" condition between the support element and the molding or other surface structure. If this pull down force is compromised by a significant force acting in the opposite direction such that the molding or other surface structure does not seat against the sheet metal panel or other support element, an unacceptable gap condition may occur within the final assembled product. Such a gap condition may result in undesired rattling noise as well as in the introduction of dirt and water between the molding or other surface structure and the underlying support structure.

As much as is reasonably possible, it is generally desirable to limit the generation of squeaks, rattles and objectionable noises that may be created from movement of the retainer relative to the parts to which it is connected. By way of example only, and not limitation, various sealing arrangements for push through retainers are illustrated and described in U.S. Pat. No. 5,173,026 to Cordola et al. and US published application 2006/0099051 to Moerke, the contents of all of which are incorporated herein by reference in their entirety. To minimize corrosion, it is desirable also to prevent moisture from precipitation, carwashes, etc. from seeping past the retainer, and through the aperture in which the retainer is installed.

A variety of sealing structures have been used to minimize rattles and squeaks and to prevent moisture seepage past the retainer. Independent concave skirts such as described in US published application 2006/0099051 have been used in conjunction with push-in retainers at the base of the head to confront the body panel around the aperture in the panel. Elastomeric and foam seals also have been used to further improve sealing qualities against moisture penetration.

Although retainers as described incorporating concave skirts and/or seals have been used successfully to limit squeaks and rattles and to inhibit the penetration of moisture past the retainer, further improvements are desirable. Installing the seal as a separate part is cumbersome and awkward, complicating installation of the retainer. If installed on the retainer in advance, the seal can become dislodged, even if properly placed on the retainer. In automated assembly plants, a retainer missing a seal may not be detected and may be installed on the article in which it is used inadvertently. A loose retainer of this type will rattle or squeak, may provide a path for the penetration of moisture and may not adequately secure the second article or item as required. If the seal is adhered to the skirt of the retainer, the seal may not function optimally if the retainer is not seated squarely in the panel. Further, the position of the seal relative to the retainer skirt has limited the range of panel thicknesses with which the retainer can be used effectively to provide a seal against moisture intrusion.

As will be understood by those of skill in the art, a seal which is held between the retainer head and the support panel may experience a build, stack up condition as compression force is applied which results in a counteracting upward force being applied against the head which may partially offset the pull-down force provided by the deflectable wings. In some cases, the presence of seal elements which are compressed between the retainer head and the support panel may block the lower collar feature of the retainer from getting close enough to the underlying sheet metal panel to establish the desired "zero gap" condition between the sheet metal panel and the overlying molding or other surface structure. That is, the compressed seal in stack-up condition may act in the manner of a spacing shim holding the retainer head further away than intended from the sheet metal panel or other underlying support element.

With the retainer head in this elevated condition, the attached molding or other surface element will likewise be held away from the panel or other support element and a gap condition may result.

SUMMARY

The present disclosure provides advantages and alternatives over the prior art by providing a connection assembly including a push-in type retainer having a functional sealing feature that does not experience a build, stack up condition that may reduce the clamp load force. Thus, the retainer is not blocked from assuming its designed orientation relative to the sheet metal panel or other underlying support element. A "zero gap" condition is thereby established and maintained between the sheet metal panel or other underlying support element and the mating molding substrate or other surface element.

In accordance with one exemplary feature, the present disclosure provides a connection assembly adapted to join a surface element such as molding or the like to an underlying support structure such as a sheet metal panel or the like while maintaining a substantially zero gap abutting relation between the surface element and the support structure during use. The connection assembly includes a press-in retainer adapted for insertion into an acceptance opening in the support structure to establish operative connecting engagement between the surface element and the support structure. The retainer includes a retainer head and a clip portion of arrowhead configuration projecting outwardly away from the retainer head. The retainer head includes an upper platform and an annular platform defining a lower collar positioned in spaced relation below the upper platform. The clip portion includes a central stem extending downwardly away from the lower collar and a pair of flexible wings extending in upward angled relation away from a central stem. The retainer further includes a seal disposed at least partially about the lower collar. The seal includes a body portion engaging the lower collar and a sealing foot projecting downwardly and radially outwardly away from the body portion to a free edge such that the sealing foot is disposed outboard from the lower collar. The underside of the sealing foot forms an obtuse angle relative to the underside of the lower collar. The sealing foot flexes about a living hinge while remaining outboard from the lower collar and maintains continuous sliding contact with the support panel in response to applied pressure between the seal and the support panel during use.

Other features and advantages of the present disclosure will become apparent from a description of certain preferred embodiments thereof which are shown in the drawings.

Before the embodiments of the disclosure are explained in detail, it is to be understood that the disclosure is not limited in its application to the details of construction and the arrangements of the components set forth in the following description or illustrated in the drawings. The disclosure is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION

Figure 1:
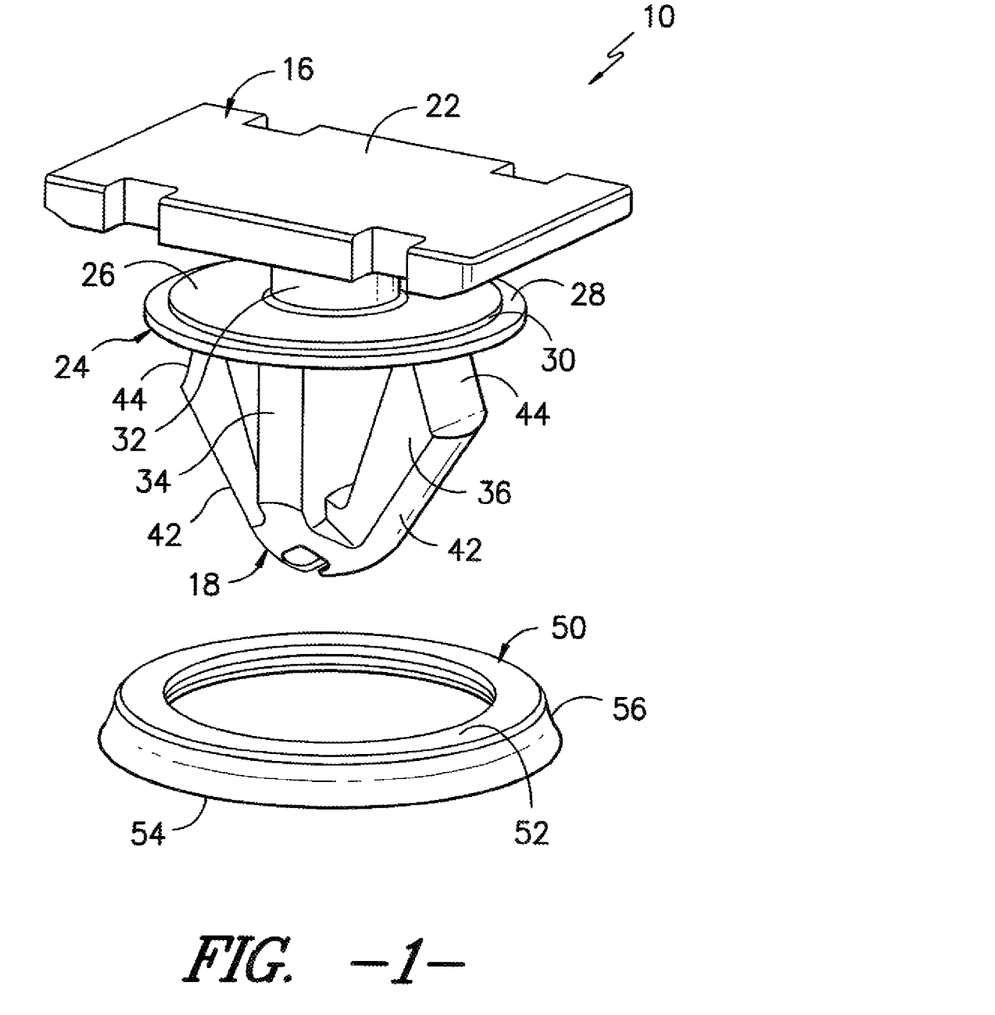
FIG. 1 is an exploded perspective view illustrating an exemplary sealing retainer in accordance with the present disclosure with the seal separated from the retainer body.
Figure 2:
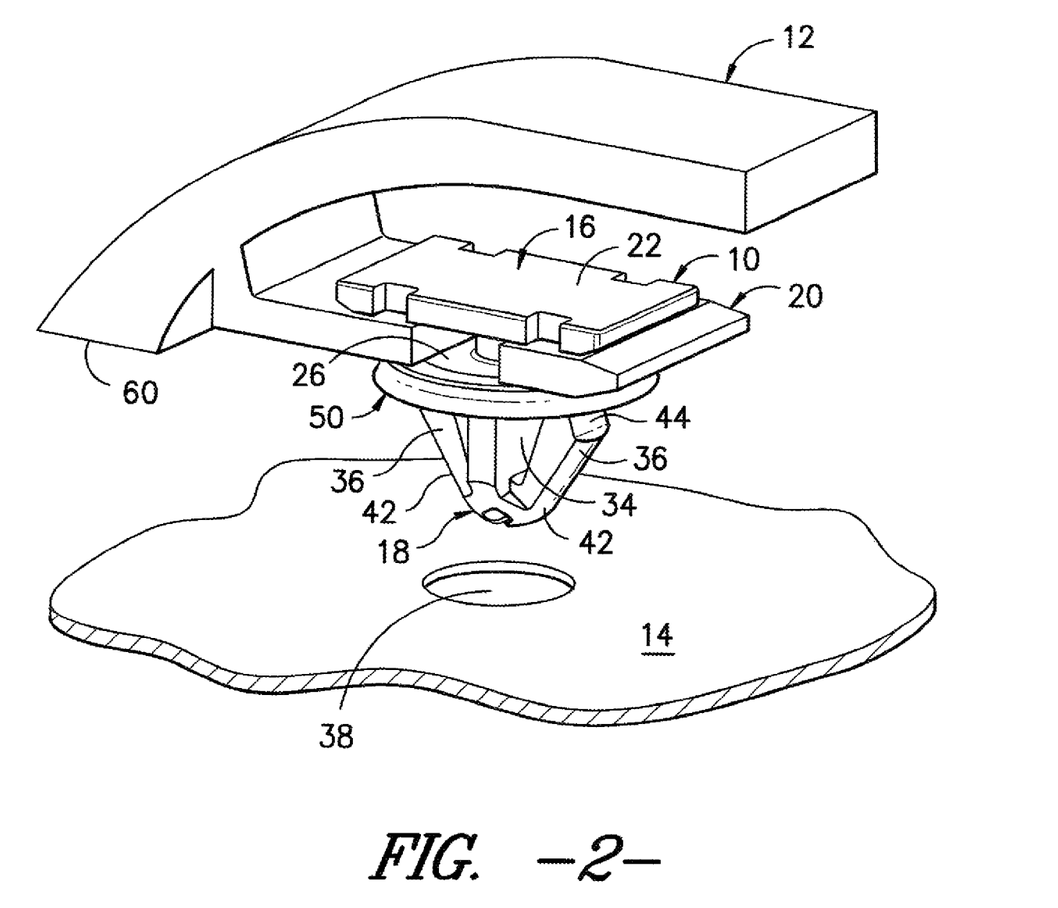
FIG. 2 is an elevation perspective view illustrating an exemplary sealing retainer in accordance with the present disclosure engaging trim molding prior to insertion through a sheet metal support structure.

Referring now more specifically to the drawings, and to FIGS. 1 and 2 in particular, it may be seen that the present disclosure provides a retainer 10 adapted to secure a surface element 12, such as, e.g., a molding, to a sheet metal support structure 14, such as, e.g., a panel or other underlying support element of metal or the like. As shown, in the illustrated exemplary construction, the retainer 10 includes a retainer head 16 and a snap engaging clip portion 18. As will be appreciated, the retainer head 16 and the clip portion 18 may be formed as a monolithic unitary body by injection molding or other suitable molding or fabrication process. The material for retainer 10 can be selected as optimally desirable for its particular installation and use. Accordingly, the retainer 10 may be formed of suitable plastic, such as Nylon, polypropylene, acetal resin and the like as will be well known to those of skill in the art. Acetal resin and Nylon 6.6 may be preferred in some environments of use. Of course, other polymeric and non-polymeric materials including metal and the like and combinations of various polymeric materials also may be used if desired. Likewise, it should be understood that the particular configurations for the retainer head 16 and for the clip portion 18 may be varied in a manner as may be desired for a particular installation.

By way of example only, and not limitation, in the illustrated exemplary construction for the retainer 10, the retainer head 16 is adapted for sliding receipt and retention within an intermediate connector 20 (FIG. 2) such as a dog house connector or the like disposed in hidden relation at the underside of the surface element 12. In this regard, the intermediate connector 20 may be formed integral with the surface element 12 as shown or may be a separate attached structure as may be desired.

As shown, in the illustrated exemplary construction, the retainer head 16 includes a table-like upper platform 22 disposed in opposing relation to a lower collar 24 of substantially rigid, annular construction. In this regard, while the upper platform 22 is illustrated as having a generally rectangular configuration, it is likewise contemplated that other polygonal or circular geometries may be used if desired. As shown, the lower collar 24 may be in substantially perpendicular non-angled orientation to the travel path of the retainer and may include an interior collar portion 26 and a reduced thickness outer annular lip 28 disposed circumferentially about the interior collar portion such that a step 30 is disposed at the intersection of the interior collar portion 26 and the outer annular lip 28. A neck structure 32 in the form of a reduced diameter post extends between the upper platform 22 and the lower collar 24. As will be understood, the effective outer diameters defined by the upper platform 22 and by the lower collar 24 are preferably greater than the effective outer diameter defined by the neck structure 32.

In operation, the retainer 10 may be operatively secured to the intermediate connector 20 by sliding the neck structure 32 into a slot in the intermediate connector 20 in a manner as will be well known to those of skill in the art. The intermediate connector may, in turn, be attached to the overlying surface element 12 or other surface element. Likewise, the retainer head 16 may be connected directly to an overlying component by techniques such as tape, adhesive bonding, mechanical joining or the like if desired.

As indicated previously, the retainer 10 further includes a clip portion designated generally as 18 extending away from the underside of the lower collar 24. In the illustrated exemplary construction, the clip portion 18 includes a stem 34 projecting away from the lower collar 24 such that the lower collar is oriented substantially perpendicular to an axis defined by the stem. As illustrated, wing elements 36 extend upwardly in angled relation away from the end of the stem 34. The wing elements 36 are adapted to flex inwardly towards the stem 34 during insertion through an acceptance opening 38 in the support structure 14. As best seen through joint reference to FIGS. 1 and 3, in the illustrated exemplary construction each of the wing elements 36 incorporates an outer face having a dogleg configuration facing generally outwardly away from the stem 34. In this regard, in the illustrated construction, the outer face of each wing element 36 includes a proximal face surface 42 extending in angled relation away from the axis defined by the stem 34. A distal face surface 44 extends away from the proximal face surface in angled relation back towards the axis defined by the stem 34 ultimately terminating at the free tip of the wing element thereby establishing the outer surface dogleg profile. As shown, the free tips of the wing elements are at an elevation below the lower collar 24.

Figure 3:
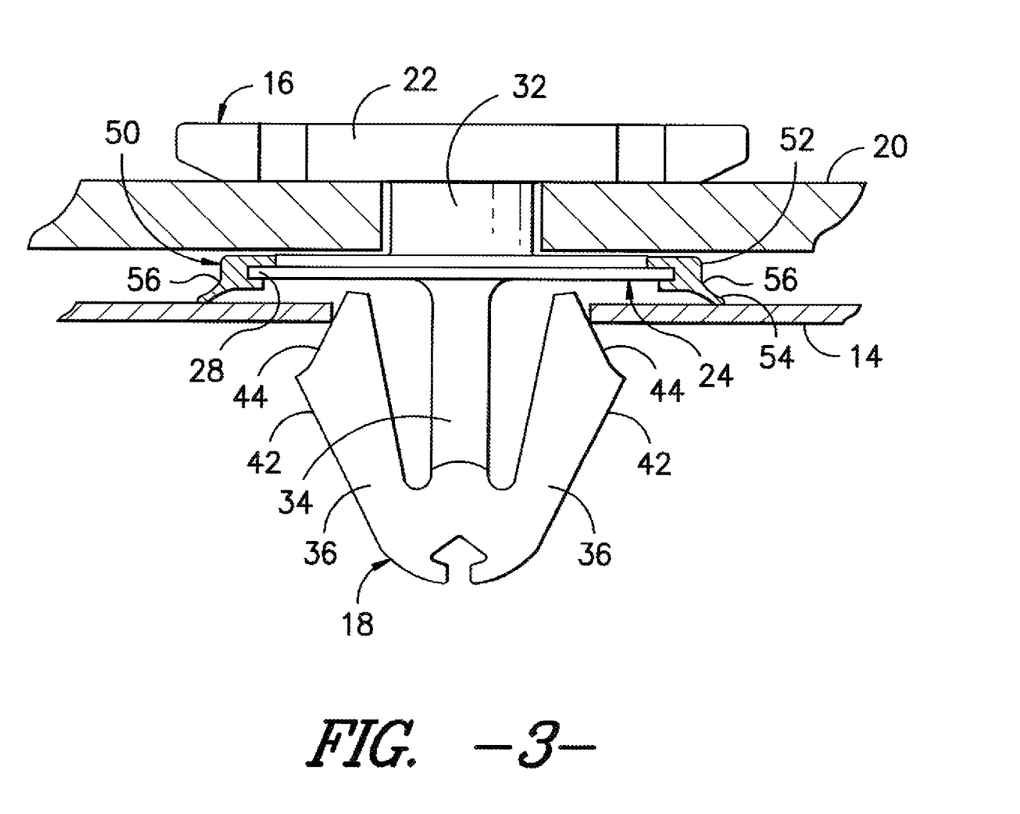
FIG. 3 is a cross-sectional view illustrating an exemplary sealing retainer in accordance with the present disclosure inserted through an underlying support structure having wing elements that engage the underlying support structure.

As best seen through joint reference to FIGS. 1-3, a monolithic perimeter seal 50 of flexible polymeric material is disposed about the perimeter of the lower collar 24 generally at the intersection between the retainer head 16 and the clip portion 18. As best seen in FIG. 3, the inner diameter of the perimeter seal 50 may substantially cover the outer annular lip 28 of the lower collar 24 and may abut the step 30. The perimeter seal 50 may be formed from commercially available moldable materials such as thermoplastic elastomers including, by way of example only, polyolefins, PVC, silicone rubber, PTFE, polyvinylidene fluoride (PVDF), fluorinated ethylene propylene (FEP) and blends thereof. Such materials will preferably be of lower durometer (i.e. are less rigid) than the material forming the retainer head and may be characterized by a useful operating temperature range of about −75° C. to about 175° C. In accordance with one exemplary construction, the perimeter seal 50 may be formed by over-molding or two-shot molding processes such that during molding the flexible material forming the perimeter seal 50 is integrally fused with the more rigid acetal resin or other material forming the lower collar 24. It is also contemplated that the perimeter seal 50 may be formed separately with a circumferential acceptance slot around the interior for receipt and retention of the annular lip 28 in a stretch-fit relation if desired. In any event, the seal 50 defines a relatively soft, deformable covering at the perimeter edge of the lower collar 24 adapted to provide a seal around the acceptance opening 38 in the support structure 14 during use without the need for any sealing structures oriented below the lower collar.

As best seen in FIG. 3, the perimeter seal 50 may be substantially annular and may include a main body portion 52 adapted to cover the outer annular lip 28 of the lower collar 24. A hingeable outwardly flared sealing foot 54 extends in angled relation downwardly and radially away from the main body portion 52. As shown, the sealing foot 54 is elongated and relatively thin in cross-section. In an unstressed condition (FIG. 4), the sealing foot 54 extends radially outboard from the main body portion 52 to a free edge such that the sealing foot is disposed entirely outboard from lower collar 24 and the underside of the sealing foot forms an obtuse angle relative to the underside of the lower collar 24. As shown, no portion of the angled sealing foot 54 is in the zone below the lower collar 24.

When the sealing foot 54 is pressed against the support structure 14 during normal use, the sealing foot 54 readily flexes upwardly towards a flattened condition about a living hinge 56 substantially at the intersection with the body portion 52. This hinging takes place without confinement of the sealing foot between the support structure 14 and the lower collar 24 while continuously maintaining contacting engagement with the underlying support structure 14. Thus, the sealing foot 54 may flex from its unstressed condition (FIG. 4) to its fully flexed position (FIG. 5) without experiencing a stack-up condition of seal material between the support structure 14 and the lower collar 24. As the sealing foot 54 flexes during compression, the edge of the sealing foot 54 moves radially outwardly as the sealing foot 54 takes on a more flattened condition. As this flattening takes place, the sealing foot 54 moves out of the way of the travel path for the lower collar 24. This avoids any confinement and stack-up of seal material between the support structure 14 and the lower collar 24 while nonetheless maintaining a sealing condition relative to the support structure 14. Accordingly, the retainer head 16 and the attached surface element 12 may be pulled downwardly to a position wherein the surface element 12 and the underlying support structure 14 form a substantially flush "zero gap" condition while maintaining a seal around the acceptance opening 38. In this regard, it will be understood that such a zero gap condition occurs when a contact surface 60 on the surface element 12 assumes a contacting abutting relation with the underlying support structure 14. As will be appreciated, the elevation and contour of the contact surface 60 may be selected to provide this zero gap condition when the sealing foot 54 is in a flexed condition relative to the support structure 14 and with the lower collar 24 elevated relative to the support structure 14.

Referring now to FIGS. 2 and 3, it will be seen that in normal operation (FIG. 3), a portion of the sloped distal face surface 44 may be in contacting relationship with the inner perimeter surface of the acceptance opening 38. In the normal operating condition shown in FIG. 3, the retainer 10 is urged downwardly continuously as the flexed wing elements press outwardly against the perimeter surface of the acceptance opening 38. However, downward movement will be limited once the surface element 12 comes into contact with the underlying support structure 14 to establish a zero gap condition. Thus, in the condition shown by FIG. 3, a condition of static equilibrium is established when the surface element 12 comes into contact with the underlying support structure 14. Since the retainer 10 is urged continuously downwardly due to the sloped distal face surface 44, the retainer will naturally assume and retain the level at which the surface element 12 contacts the underlying support structure 14 and thereby blocks further downward movement. As shown, in this equilibrium condition, the lower collar 24 remains slightly elevated relative to the support structure 14 and the sealing foot 54 of the perimeter seal 50 is hinged outwardly while maintaining a sealing relationship against the support structure 14. As can be seen, the sealing foot 54 is adapted to flex outwardly in a hinging action as the retainer moves downwardly without blocking further downward movement by the retainer 10.

Figure 4:
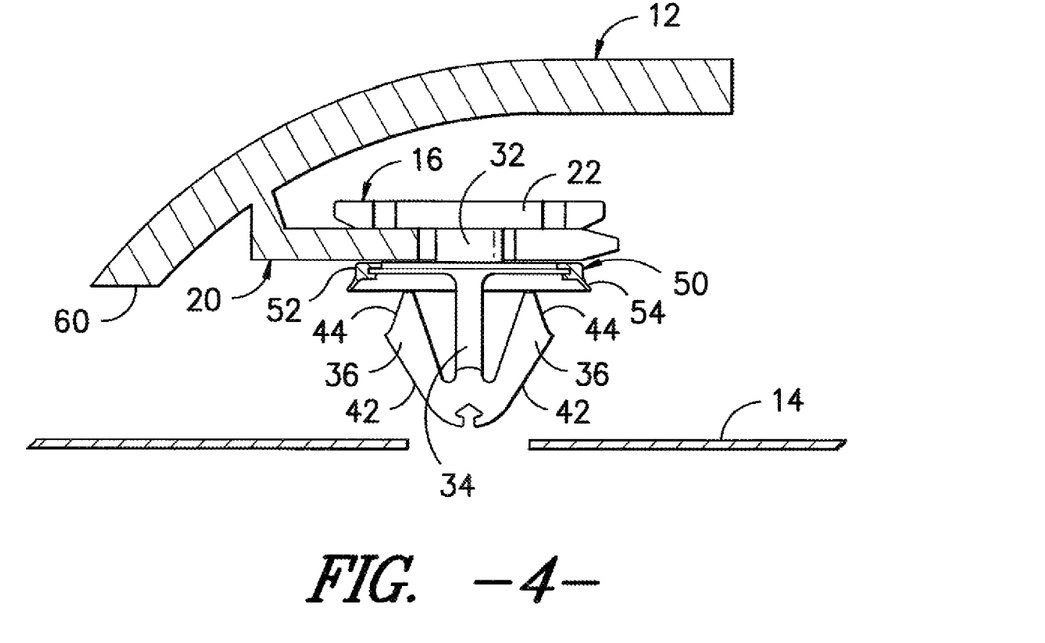
FIG. 4 is a cross-sectional view illustrating an exemplary sealing retainer in accordance with the present disclosure engaging trim molding prior to insertion through a sheet metal support structure and with the seal in an unstressed condition.

As will be appreciated, the equilibrium position of the retainer 10 within the acceptance opening 38 is continuously self-adjusting as the relative positions of the surface element 12 and the support structure 14 change during use as a result of vibration or other events. In this regard, the living hinge 56 urges the sealing foot 54 continuously against the underlying support structure 14 as the sealing foot 54 attempts to resume its normal unflexed condition (FIG. 4). Thus, the sealing relationship provided by the sealing foot 54 is maintained by sliding contact as the retainer 10 moves up and down and the sealing foot 54 moves radially in and out during equilibrium adjustment. That is, although the angle between the support structure 14 and the sealing foot 54 may change as the retainer 10 moves up and down, the sealing relation is maintained as the sealing foot 54 moves in sliding relation over the support structure 14. Moreover, since the sealing foot 54 is not confined between the lower collar 24 and the support structure 14, downward movement of the surface element 12 is unobstructed by the sealing element.

Figure 5:
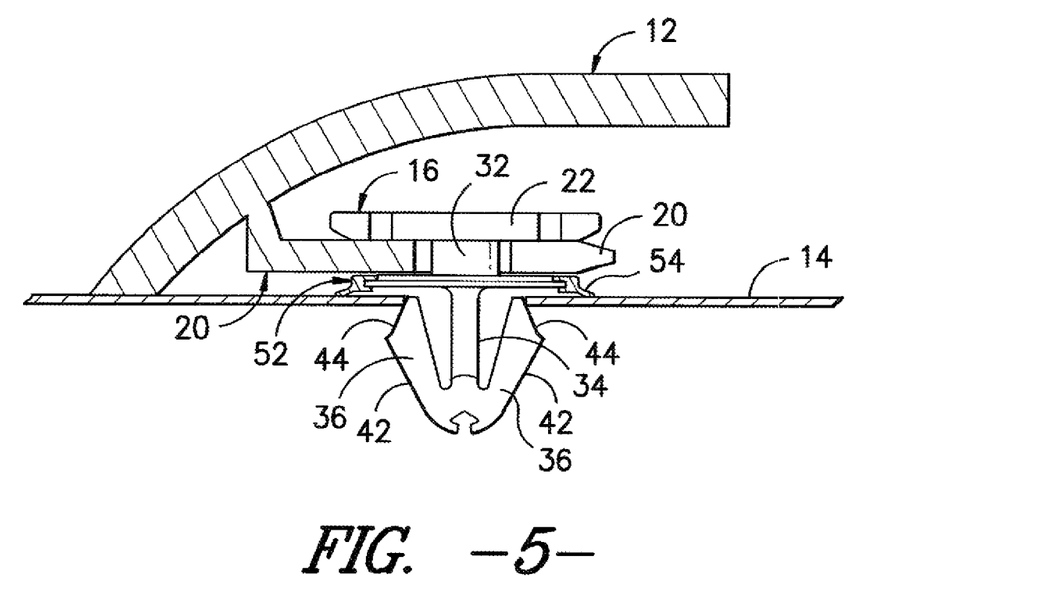
FIG. 5 is a cross-sectional view illustrating an exemplary sealing retainer in accordance with the present disclosure engaging trim molding after full insertion through a sheet metal support structure with a retained "zero gap" condition between the trim molding and the support structure and illustrating the compression action of the seal in an extreme insertion condition.

As best seen in FIG. 5, in the event of extreme insertion such that the tips of the wing elements wing elements 36 are within the acceptance opening, in the support structure 14, the sealing foot 54 may assume a substantially flattened condition against the underlying support structure 14 as the surface element 12 establishes a "zero gap" condition with the support structure 14. Even in this extreme insertion condition, the sealing foot is not confined between the lower collar 24 and the support structure 14. Accordingly, no stack-up condition and resultant shim action is created. Thus, the surface element 12 may continue to be pulled down to the desired "zero gap" condition over the full range of operative engagement positions between the wing elements 36 and the support structure 14 with the sloped distal face surface 44 bearing against the support structure 14.

The ability to avoid a stack-up condition is promoted by maintaining the free space between the lower collar 24 and the underlying support structure 14 during downward movement such that portions of the seal material do not collect in the free space in a manner which would limit downward movement. This free space below the lower collar is maintained even in the extreme insertion condition shown in FIG. 5. As shown, all portions of the sealing foot 54 are positioned radially outboard from the lower collar 24 and the free edge of the sealing foot 54 is adapted to slide radially outwardly away from the lower collar 24 and the main body portion 52 as the retainer head 16 moves downwardly and the sealing foot 54 hinges outwardly. Thus, the sealing foot 54 flattens by hinging outwardly about the living hinge 56 as it is pressed against an underlying support structure 14. Accordingly, the sealing foot 54 does not interfere with downward movement of the retainer head 16 and the surface element 12 may be maintained in a "zero gap" condition with the underlying support structure 14.

While various spatial and directional terms, such as upper, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Of course, variations and modifications of the foregoing are within the scope of the present disclosure. It is to be understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

What is claimed is:

1. A press-in retainer, comprising:
   a retainer head defining a central axis and including a collar and a seal disposed at least partially about the collar, the collar being perpendicular with respect to the central axis and defining an annularly continuous step at an outer end thereof; and
   a clip portion projecting from the collar,
   wherein the seal includes a main body engaging the collar and a sealing foot disposed entirely outboard from the collar,
   wherein the sealing foot is configured to hinge about an intersection of the sealing foot and main body while remaining entirely outboard from the main body,
   wherein, in a substantially flattened condition of the sealing foot, an angle between the sealing foot and a distal surface of the main body approaches a flat contiguous surface, and
   wherein, in an insertion condition of the press-in retainer, the entire seal is disposed radially farther from the central axis than the entire clip portion.

2. The press-in retainer of claim 1, wherein the sealing foot projecting from the distal surface of the main body forms obtuse angles on both an underside and upper surface of the seal.

3. The press-in retainer of claim 2, wherein the obtuse angles on the underside and upper surfaces of the seal are substantially opposite to each other.

4. The press-in retainer of claim 1, wherein the collar includes a reduced thickness outer annular lip such that a step is disposed at an intersection of an interior collar portion and the outer annular lip.

5. The press-in retainer of claim 4, wherein the main body of the seal substantially covers the outer annular lip of the collar.

6. The press-in retainer of claim 5, wherein an inner diameter of the seal abuts the step.

7. The press-in retainer of claim 4, wherein the seal does not extend inwardly past the reduced thickness outer annular lip of the collar.

8. The press-in retainer of claim 4, wherein the main body of the seal engages only the reduced thickness outer annular lip.

9. The press-in retainer of claim 1, wherein the sealing foot can flex from its unstressed condition to its fully flexed position without experiencing a stack-up condition of seal material beneath the lower collar.

10. The press-in retainer of claim 1, wherein no portion of the sealing foot is in a zone below the lower collar.

11. The press-in retainer of claim 1, wherein the seal is formed on the collar by over-molding such that a material forming the seal is integrally fused with a material forming the collar.

12. The press-in retainer of claim 1, wherein the seal is formed separately from the lower collar.

13. The press-in retainer of claim 1, wherein the intersection of the sealing foot and main body is not in a zone below the lower collar.

14. The press-in retainer of claim 1, wherein the sealing foot can flex from its unstressed condition to a fully-flexed condition without experiencing a stack-up of seal material.

15. A retainer assembly configured to join a surface element to a support structure, the support structure having an acceptance opening, the retainer assembly comprising:
a retainer head defining a central axis and including a collar, a platform, and a neck disposed between the collar and the platform, the retainer head being configured for placement into a channel defined by the surface element, and the collar being perpendicular with respect to the central axis and defining an annularly continuous step at an outer end thereof;
a seal disposed about a perimeter of the collar and comprising an annular main body and a sealing foot, the sealing foot being connected to the main body by a living hinge extending along a perimeter of the main body and being disposed entirely outboard from the collar, and the sealing foot extending from the living hinge to a free edge that is disposed radially outwardly from the living hinge; and
a clip portion extending from the collar of the retainer head,
wherein the collar includes an interior collar portion and a reduced thickness outer annular lip disposed circumferentially about the interior collar portion such that a step is disposed at an intersection of the interior collar portion and the outer annular lip, the outer annular lip extending radially outwardly from a perimeter of the interior collar portion, and
wherein the main body of the seal further includes a circumferential acceptance slot that extends circumferentially along an inner diameter of the main body and is configured to receive the annular lip of the collar, and
wherein, in an insertion condition of the press-in retainer, the entire seal is disposed radially farther from the central axis than the entire clip portion.

16. The retainer assembly of claim 15, wherein the sealing foot cannot stack up against the main body of the seal.

17. The retainer assembly of claim 15, wherein the sealing foot projecting from a distal surface of the main body forms obtuse angles on both an underside and upper surface of the seal that are substantially opposite to each other.

18. The retainer assembly of claim 15, wherein the main body of the seal substantially covers the outer annular lip of the collar and abuts the step.

19. The retainer assembly of claim 15, wherein the seal does not extend inwardly past the reduced thickness outer annular lip of the collar.

20. The retainer assembly of claim 15, wherein the intersection of the sealing foot and main body is not in a zone below the lower collar.

* * * * *